(12) United States Patent
Guyon et al.

(10) Patent No.: US 11,267,994 B2
(45) Date of Patent: Mar. 8, 2022

(54) METHOD FOR PRODUCING A MULTILAYER COVERING FILM

(71) Applicant: HEXIS SA, Frontignan (FR)

(72) Inventors: Vincent Guyon, Montpellier (FR); Christophe Baudrion, Bouziques (FR); Michel Mateu, Balaruc le Vieux (FR)

(73) Assignee: Hexis SA, Frontignan (FR)

(*) Notice: Subject to any disclaimer, the term of this patent is extended or adjusted under 35 U.S.C. 154(b) by 36 days.

(21) Appl. No.: 16/620,466

(22) PCT Filed: Jun. 7, 2018

(86) PCT No.: PCT/FR2018/051333
§ 371 (c)(1),
(2) Date: Dec. 6, 2019

(87) PCT Pub. No.: WO2018/224788
PCT Pub. Date: Dec. 13, 2018

(65) Prior Publication Data
US 2021/0147722 A1 May 20, 2021

(30) Foreign Application Priority Data
Jun. 8, 2017 (FR) .................................... 1755094

(51) Int. Cl.
| | |
|---|---|
| *C09J 7/40* | (2018.01) |
| *C09J 7/22* | (2018.01) |
| *C09J 7/38* | (2018.01) |
| *B32B 7/06* | (2019.01) |
| *B32B 7/14* | (2006.01) |
| *B32B 37/00* | (2006.01) |

(Continued)

(52) U.S. Cl.
CPC ............... *C09J 7/403* (2018.01); *B32B 7/06* (2013.01); *B32B 7/14* (2013.01); *B32B 37/0007* (2013.01); *B32B 38/10* (2013.01); *C09J 5/00* (2013.01); *C09J 7/22* (2018.01); *C09J 7/38* (2018.01); *B32B 2405/00* (2013.01); *C09J 2301/122* (2020.08); *C09J 2301/302* (2020.08)

(58) Field of Classification Search
CPC . B32B 2405/00; B32B 37/0007; B32B 38/10; B32B 7/06; B32B 7/14; C09J 2301/122; C09J 2301/204; C09J 2301/302; C09J 5/00; C09J 7/22; C09J 7/38; C09J 7/40; C09J 7/403
See application file for complete search history.

(56) References Cited

U.S. PATENT DOCUMENTS

2009/0053449 A1* 2/2009 Hannington ............... C09J 7/35
428/41.8
2014/0154492 A1* 6/2014 Traser ......................... C09J 7/10
428/220

FOREIGN PATENT DOCUMENTS

WO 2006076116 A1 7/2006

* cited by examiner

*Primary Examiner* — Sonya M Sengupta
(74) *Attorney, Agent, or Firm* — Craft Chu PLLC; Andrew W. Chu (57) ABSTRACT

The method for producing a multilayer covering film includes having a pressure sensitive adhesive layer protected by a liner with a system for controlling adhesion. The method includes a step of forming the adhesion-controlling system, which includes an operation for selectively positioning a polymeric, non-adhesive material composition in microcavities provided on one face of the liner. The inven- (Continued)

tion also relates to a multilayer film produced using this production method and a method for applying this multilayer film.

18 Claims, 1 Drawing Sheet

(51) Int. Cl.
*B32B 38/10* (2006.01)
*C09J 5/00* (2006.01)

METHOD FOR PRODUCING A MULTILAYER COVERING FILM

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of solutions for covering a two-dimensional surface and/or a three-dimensional surface.

2. Description of Related Art Including Information Disclosed Under 37 CFR 1.97 and 37 CFR 1.98

In a known way, covering solutions in the form of film are used to cover two- and three-dimensional objects with a view to their decoration, protection against external aggressions, or even to give the object in question remarkable properties (UV filter, antibacterial covering, protection against grit, scratch resistance, protection against sandstorms, etc.).

Generally speaking, a multilayer covering film comprises, on the one hand, a polymeric layer forming a body of film that confers on the multilayer film its remarkable physico-chemical, mechanical and optical properties such as opacity, printability, flexibility and color and, on the other hand, an adhesive layer that has specific viscoelastic properties that enable it to secure the covering film in a semi-permanent manner to the object or to the surface to be covered.

During its production, the adhesive layer of the multilayer covering film is covered by an easily separable removable liner that serves to protect the adhesive layer during its transportation or storage before the multilayer covering film is installed on a two- or three-dimensional object.

A method of applying these multilayer films has been considerably developed; it involves an application by stretching the multilayer film, which has significant properties of elasticity. Advantageously, a professional trained in this method of application is capable of installing a multilayer film on a two- or three-dimensional object of any dimension using a minimum amount of material.

One drawback of this type of installation lies in the installation time required to perfectly cover the two- or three-dimensional object. This problem is illustrated by the cost of installation of such a multilayer film, which represents a major part of the total cost of covering an object or a surface. Moreover, if the professional performing the installation positions the film incorrectly, he is obliged to perform an operation to adjust the position, which involves peeling off and repositioning the film on the object to be covered. In order for the covering film to be correctly positioned, an operation to adjust the position may be repeated a certain number of times resulting in the deterioration of the physico-chemical, mechanical and visual properties of the covering film.

With a view to reducing the installation time for this type of covering film by facilitating in particular the operations to adjust the position, several solutions have been proposed. Each solution has the same objective, to produce a covering film that has particles of non-adhesive material on the surface of the adhesive layer, which is designed to be placed in contact with the two- or three-dimensional object to be covered. Advantageously, these particles of non-adhesive material are intercalated between the adhesive layer and the surface of the object to be covered. Limiting the contact of the adhesive layer with the surface of the object to be covered facilitates the operations to adjust the position. The installation of the multilayer covering film is faster and reduces the deterioration of the remarkable properties of the multilayer covering film. The effect desired from introducing non-adhesive material is to enable the multilayer film to slide when in contact with the surface of the object to be covered while the multilayer film is being positioned.

In this document, the concept of sliding means that when the adhesive layer of the multilayer film is placed in contact with the object to be covered without pressure being applied to the multilayer film, the adhesive layer does not adhere to the surface of the object to be covered. In fact, the particles that are on the surface of the adhesive layer prevent the adhesive from adhering to the surface of the object to be covered. The multilayer covering film can thus slide on the surface of the object to be covered so that it can be correctly positioned. Once the multilayer covering film is placed in a desired position, the installer applies a pressure to the multilayer film that enables the adhesive layer to come into contact with the surface of the object to be covered and to adhere thereto.

A first solution involves applying non-adhesive material directly in the liquid state onto the adhesive layer in a regular or random pattern. The application is usually made by inkjet using a specific print tool. The non-adhesive material is projected onto the adhesive layer and then hardened, usually by UV crosslinking, before the liner is laminated onto the adhesive layer provided on the surface of the non-adhesive material in the cross-linked state.

A second solution involves applying the non-adhesive material in the liquid state onto a face of the liner in a regular or random pattern. Similarly, the application is preferably performed by inkjet, followed by a step of a hardening operation of the non-adhesive material usually performed using UV crosslinking. The face of the liner that comprises the non-adhesive material is then laminated onto the adhesive layer of the covering film. It should be noted that the face of the liner covered with non-adhesive material could be embossed before the adhesive layer is laid onto the liner.

One drawback of these two solutions lies in the implementation of these production methods that require a manufacturer to make large investments in specific equipment such as a print tool controlled by software so as to apply the non-adhesive material in predetermined or random patterns. Or embossing units so as to emboss the liner in order to insert particles of non-adhesive material into the adhesive layer. In certain cases, a second embossing step can be performed in order to form "air egress" channels. However, embossing is a delicate operation that slows down the production process. In fact, owing to their speed of execution, embossing units can be a problem if they are implemented in a production line process that would involve, for example, a step of forming the non-adhesive material by projection, the operation of which is faster.

BRIEF SUMMARY OF THE INVENTION

In this context, the applicant has developed an alternative solution by adopting an ingenious production method that uses tools that are inexpensive and commonplace for a manufacturer of multilayer covering films.

To this end, a first aspect of the invention concerns a method for producing a multilayer covering film that comprises a pressure sensitive adhesive layer protected by a liner that is provided with an adhesion-controlling system.

The production method is characterized in that it includes a step of forming the adhesion-controlling system, which comprises an operation for selectively positioning a polymeric, non-adhesive material composition in microcavities provided on one face of the liner.

The use of a liner comprising a face interspersed with microcavities makes it possible to form an adhesion-controlling system placed solely in the microcavities, notably via an operation of selective positioning, which is preferably performed by applying a coat of the polymeric non-adhesive material composition in the liquid state. Thus, the operation of selective positioning is easy to implement, quick and uses industrial equipment that is commonplace for a company specialized in the production of covering solutions.

Furthermore, according to a first embodiment of the first aspect of the invention, the step of forming the adhesion-controlling system includes an operation of hardening the polymeric, non-adhesive material composition that solidifies when it is placed in the microcavities in the face of the liner.

According to a second embodiment of the first aspect of the invention, the selective positioning operation is performed by applying a coating using a spreading tool adjusted at a set height from the face of the liner so that, as the spreading tool passes over, it forces the non-adhesive material composition to fill and concentrate solely in the microcavities. To this end, the spreading tool is adjusted to a height from the face of the liner that is between 0 μm and 100 μm, preferably the spreading tool is adjusted to a height from the face of the liner of between 0 μm and 5 μm and preferably the spreading tool is adjusted to a height from the face of the liner of between 0 μm and 2 μm.

The use of a spreading tool to apply the coating of the polymeric, non-adhesive material is in line with an approach of adopting a fast production method that is easy to implement within a company specialized in the production of covering solutions.

According to a third embodiment of the first aspect of the invention, the polymeric, non-adhesive material composition has a low surface tension that is between 10 mN/m and 60 mN/m.

Surface tension is an important parameter. It defines at least partly the ability of the polymeric, non-adhesive material composition to fill the microcavities. Thus, a low surface tension of between 10 mN/m ad 60 mN/m increases the filling percentage of the microcavities arranged within the face of the liner.

According to a fourth embodiment of the first aspect of the invention, the polymeric, non-adhesive material composition is formed by a thermoplastic polymer in solvent phase. According to this embodiment, the operation of hardening the polymeric, non-adhesive material composition is performed by the elimination of the solvent, preferably the elimination of the solvent results from evaporation by physical drying of the solvent.

According to a fifth embodiment of the first aspect of the invention, the polymeric, non-adhesive material composition comprises precursor monomers of a non-adhesive polymer. According to this embodiment, the hardening operation of the polymer, non-adhesive material composition involves an operation of polymerization of the precursor monomers of the non-adhesive polymer.

According to an option of the fifth embodiment of the first aspect of the invention, the polymerization operation is performed by crosslinking, preferably UV-catalyzed crosslinking.

According to a sixth embodiment of the first aspect of the invention, the polymeric, non-adhesive material composition is formed by a "hot-melt" polymer. According to this embodiment, the hardening operation is performed by cooling the hot-melt polymer.

According to a seventh embodiment of the first aspect of the invention, the production method involves, on the one hand, a step of forming the adhesive layer that is preferably achieved by applying a coat of a formulation of adhesive polymer onto the liner which is equipped with an adhesion-controlling system and, on the other hand, an operation of hardening the formulation of adhesive polymer.

According to an eighth embodiment of the first aspect of the invention, the production method includes a step of forming a polymeric layer that forms a body of the film, the step of forming the polymeric layer preferably being performed by laying a cast film.

Moreover, a second aspect of the invention relates to a multilayer covering film obtained by a production method according to the first aspect of the invention, the multilayer film comprising a polymeric layer forming a film body the first face of which is secured with a pressure sensitive adhesive layer that is covered by a liner, characterized in that the liner comprises an adhesion-controlling system inserted in the microcavities made in an upper face of the liner that is arranged in contact with the adhesive layer.

According to a variation of the second aspect of the invention, the adhesion-controlling system is formed by a material that is non-adhesive in the solid state, the non-adhesive material being polymeric in nature.

Furthermore, a third aspect of the invention relates to a method for applying a covering film according to the second aspect of the invention that includes a step of separating the liner from the pressure sensitive adhesive layer, characterized in that during the step of separating the liner and the adhesive layer, the adhesion-controlling system is transferred from the liner to the adhesive layer by adhesion with the adhesive layer.

Advantageously, the liner acts as a vector of the adhesion-controlling system by conveying the non-adhesive material, inserted in a solid state into the microcavities in the face of the liner, to the adhesive layer of the multilayer film.

Remarkably, when the liner is separated from the adhesive layer, the controlling system covers a surface of 0.5% to 10% of the total surface of the adhesive layer.

BRIEF DESCRIPTION OF THE SEVERAL VIEWS OF THE DRAWINGS

Further features and advantages will emerge from the following detailed description of a non-limiting embodiment of the invention shown in the three accompanying Figures.

DETAILED DESCRIPTION OF THE INVENTION

The present invention relates to a method for producing a multilayer covering film 1.

Figure 1:
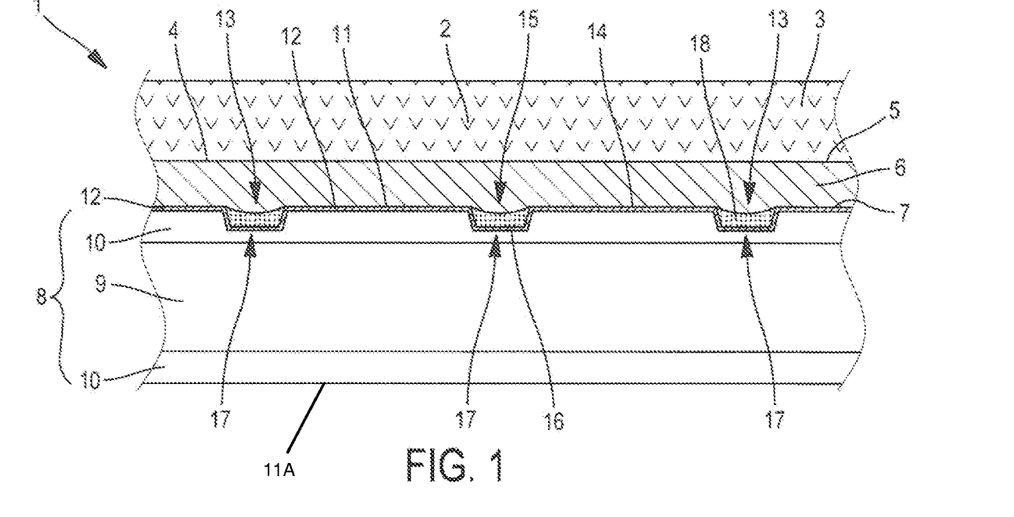
FIG. 1 is a schematic view of a representation of a cross-section of a covering film obtained according to a production method according to the invention.

In the embodiment shown in FIG. 1, the multilayer film 1 comprises a main polymeric layer 2 forming a body 3 of the film. The body 3 of the film confers upon the multilayer film 1 its physico-chemical, mechanical and optical properties.

Depending on the application for which the multilayer film 1 is intended, the thickness of the main polymeric layer 2 can range from 10 µm to over 1000 µm. Here, the main polymeric layer 2 has a thickness of between 30 µm and 100 µm.

In this embodiment the main polymeric layer 2 can be made, for example, using a polyvinyl chloride, polyurethane, polyolefin or acrylic type polymer.

In order to cover a two- or three-dimensional object in a semi-permanent manner, a first face 4 of the body 3 of the film is attached to a connection face 5 of an adhesive layer 6 that has adhesive properties enabling it to adhere sustainably to any type of support or object. Here, the adhesive layer 6 has a thickness of between 10 µm and 100 µm, preferably between 20 µm and 50 µm and preferably between 30 µm and 40 µm. The adhesive layer 6 is formed by a pressure sensitive adhesive so that the multilayer film 1 can be installed on an object and positioned by stretching.

The pressure sensitive adhesive can be formed by several types of polymeric derivatives that can be chosen from an adhesive compound based on acrylic polymer, polyurethane polymer, vinyl/ethylene acetate polymer, silicone, natural rubber and synthetic rubber such as styrene-butadiene (SBR) rubber or styrene-isoprene-styrene (SIS) rubber and styrene-ethylene-butylene-styrene (SEBS) rubber.

Generally speaking, the above-mentioned adhesive compounds can also be used alone or mixed with tackifying resins such as rosin derivatives or hydrocarbon derivatives.

In order to preserve the remarkable adhesive properties of the adhesive layer 6 from the moment of production of the multilayer film 1 until its installation on the object, a liner 8 is laminated onto an adhesion face 7 of the adhesive layer 6. The adhesion face 7 is opposite the connection face 5.

The liner 8 protects the adhesive layer 6 during the storage and transportation of the multilayer film 1 until the multilayer film 1 is placed on an object or a surface. For this reason, the liner 8 is removable so that a professional can easily separate it from the adhesion face 7 when installing the multilayer film 1.

Figure 2:
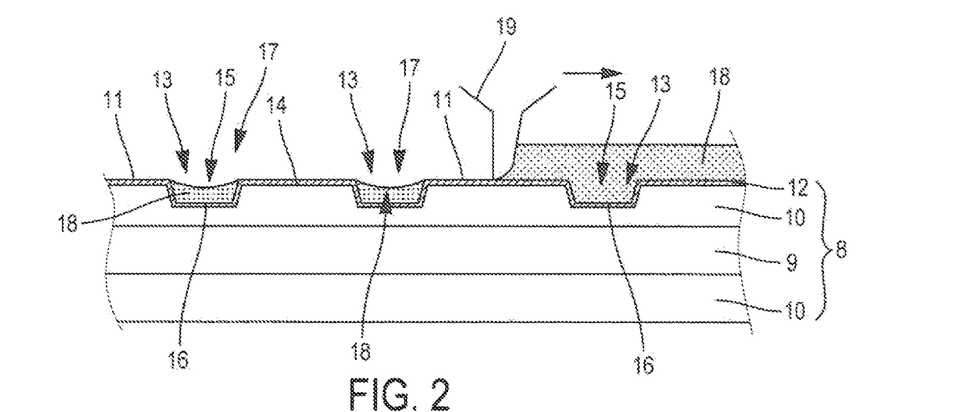
FIGS. 2 and 3 are cross-sectional views of a kinematic representation of a step of forming an adhesion-controlling system that is created by an operation of coating a face of a liner.
Figure 3:
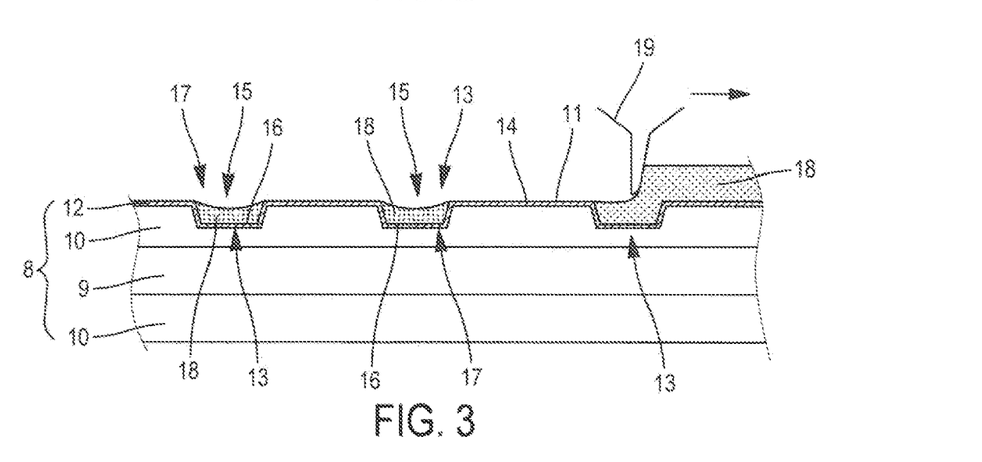

As shown in FIGS. 1 to 3, the liner 8 can consist of a polymer film or a sheet of paper, the liner 8 can be a single layer or multilayered, preferably the liner 8 is multilayered. Here, the liner 8 is multilayered and comprises a base 9 formed by a film of Kraft paper.

In this embodiment, the base 9 has a thickness of between 50 µm and 200 µm, preferably between 80 µm and 150 µm and preferably between 100 µm and 130 µm. The base 9 of the liner 8 is covered on both sides by a polymeric layer 10 that can be formed by a thermoplastic polymer of the polyolefinic type. Each polymeric layer 10 has a thickness of between 1 µm and 40 µm, preferably between 10 µm and 30 µm and preferably between 15 µm and 25 µm.

The removable character of the liner 8 is due to the nature of an upper face 11 of the liner 8 that is placed in contact with the adhesive layer 6.

As shown in FIGS. 1 to 3, a superficial layer 12 comprising silicone derivatives is arranged on the surface of an upper face or upper liner face 11 of the liner 8, opposite a lower liner face 11A. In a known way, silicone derivatives have remarkable anti-adhesive properties that facilitate the removal of the liner 8. Here, the superficial layer 12 has a thickness of between 0.1 µm and 10 µm, preferably between 0.5 µm and 5 µm, and preferably between 0.5 µm and 2.5 µm.

Such a superficial layer 12 has a superficial surface tension of between 10 mN/m and 30 mN/m, preferably the superficial surface tension is between 13 mN/m and 27 mN/m, and preferably the superficial surface tension is between 15 mN/m and 24 mN/m.

These superficial surface tension values are the source of the anti-adhesive properties of the superficial layer 12 and enable the liner 8 to be separated from the adhesive layer 6 by applying a peel force of between 0.01 N/2.5 cm and 2 N/2.5 cm, preferably the peel force is between 0.1 N/2.5 cm and 1 N/2.5 cm, and preferably the peel force is between 0.2 N/2.5 cm and 0.3 N/2.5 cm.

Furthermore, the upper face 11 is preferably micro-structured. In fact, the upper face 11 comprises microcavities 13 that are distributed across the surface of the upper face 11.

The microcavities 13 can be distributed across the surface of the upper face 11 in a random or regular pattern. A regular pattern can comprise simple geometric patterns such as a rectangle or rhombus type quadrilateral or more complex patterns.

In this embodiment, the microcavities 13 are spaced one surface interstice 14 apart, corresponding to one portion of the upper face 11 that separates the microcavities 13 by a distance of between 50 µm and 500 µm, preferably by a distance of between 100 µm and 400 µm and preferably by a distance of between 150 µm and 300 µm.

Here, the microcavities 13 are in the shape of a truncated cone and have an opening 15 arranged on the surface of the upper face 11 and a base 16 delimiting at the bottom each microcavity 13. In the present embodiment, each opening 15 is larger in dimension at the top than at the base 16. Here, the microcavities 13 are arranged within the upper face 11 and extend for a depth of between 5 µm and 50 µm and preferably for a depth of between 10 µm and 25 µm.

Moreover, the opening 15 has a diameter of between 10 µm and 80 µm, preferable a diameter of between 20 µm and 60 µm and preferably a diameter of between 30 µm and 50 µm. The base 16 of each microcavity 13 has dimensions that are less than 5% to 30%, preferably less than 10% to 25% and preferably less than 15% to 20% than the dimensions of the opening 15. This specific configuration and this ratio between the opening 15 and the base 16 confer upon each microcavity 13 a flared shape that facilitates the insertion and removal of an adhesion-controlling system 17.

In the present embodiment, the adhesion-controlling system 17 is formed by non-adhesive material 18 in the form of particles in the solid state.

The non-adhesive material 18 can be of a polymeric nature and chosen in a non-limiting way from a polymer of the type: polyurethane, polyvinyl chloride, acrylics and methacrylics, polyvinyl acetate, polyethylene, polypropylene, epoxy resin and polystyrene, as well as their derivatives.

As shown in FIGS. 1 to 3, the microcavities 13 contain the non-adhesive material 18. When the adhesive layer 6 is laid on the liner 8, the flared shape of each microcavity 13 enables the non-adhesive material 18 to be placed in contact with the adhesive layer 6 via the opening 15 of each microcavity 13.

During a method for the installation of the multilayer film 1 onto an object to be covered, a professional trained in the installation of this type of multilayer film 1 performs a step of separating the liner 8 from the adhesive layer 6. During this step of separating the liner 8, the adhesion-controlling system 17 is transferred from the liner 8 to the adhesion face 7 of the adhesive layer 6.

In fact, the step of separating the liner 8 enables the adhesion face 7 to be released from the adhesive layer 6 in contact with the object to be covered. During the step of separating the liner 8, the adhesive properties of the adhesive layer 6 encourage the retention of the non-adhesive material 18 in contact with the adhesion face 7.

In this example, after separation from the liner 8, the non-adhesive material 18 covers preferably 0.1 to 10% of the surface of the adhesion face 7 of the adhesive layer 6.

Such a percentage of covering the adhesion face 7 by the adhesion-controlling system 17 enables the contact surface between the adhesion face 7 and the object to be covered to be reduced, thus slowing down the adhesion of the adhesive layer 6 on the object to be covered.

Advantageously, during a laying step aimed at positioning the multilayer film 1 in a determined position on the surface of the object to be covered, the adhesion-controlling system 17 reduces the contact surface between the adhesion face 7 and the object to be covered, which encourages a sliding of the multilayer film 1 in contact with the surface of the object to be covered. This phenomenon of sliding facilitates the position adjustment operations and speeds up the method of installation of the multilayer film 1 without damaging the physico-chemical, mechanical and visual properties of the multilayer film 1.

When the professional is satisfied with the positioning of the multilayer film 1, a pressure is applied to the multilayer film 1 so as to finalize the adhesion of the adhesive layer 6 to the object to be covered. Such a pressure can be applied by back and forth movements that also expel the air trapped between the adhesive layer 6 and the object to be covered. The back and forth movements can be performed using a positioning tool such as a plastic squeegee.

It should be noted that after the separation of the liner 8, the pattern of distribution of the non-adhesive material 18 in contact with the adhesion face 7 can in certain cases enable the evacuation of the air that is trapped between the multilayer film 1 and the surface of the object to be covered. In fact, a repetition of the pattern of distribution of the non-adhesive material 18 can form on the surface of the adhesion face 7 evacuation channels facilitating the evacuation of the air when the installer applies pressure when passing the squeegee over the multilayer film 1. In practice, the pattern of distribution of the non-adhesive material 18 in contact with the adhesion face 7 is caused by the distribution pattern of the microcavities 13 in which the non-adhesive material 18 is inserted before the step of separating the liner 8.

As illustrated in FIGS. 2 and 3, the applicant has developed a method for producing the multilayer film 1 that includes a step of forming the adhesion-controlling system 17. In this embodiment, the step of forming the adhesion-controlling system 17 includes an operation of selectively placing a polymer composition of the non-adhesive material 18 in microcavities 13 arranged on the upper face 11 of the liner 8. The selective placing operation can be likened to an operation of selective filling of the microcavities 13. Selective placing enables the polymer composition of the non-adhesive material 18 in the liquid state to be selectively placed in the microcavities 13. The polymer composition of the non-adhesive material 18 in the liquid state does not remain so on the surface of the superficial interstices 14.

Preferably, the operation of selective placing is performed by applying a coat of a polymer composition of the non-adhesive material 18 in the liquid state onto the upper face 11 of the liner 8.

As indicated above, the non-adhesive material 18 can be of a polymeric nature. Thus, in the context of the method of producing the multilayer film 1 it is possible to use at least three types of polymer composition of non-adhesive material 18 in the liquid state.

A first type of polymer composition of the non-adhesive material 18 can be formed by a thermoplastic polymer in solvent phase such as an acrylate polymer.

A second type of polymer composition of the non-adhesive material 18 can be formed by precursor monomers of a non-adhesive polymer in the liquid state such as polyacrylate precursors comprising monomer type compounds that can be cross-linked under UV radiation and photoinitiator type compounds.

And a third type of polymer composition of the non-adhesive material 18 can be formed by a hot-melt type polymer. A hot-melt type polymer can be made on the basis of a polymer of the polyamide, ethylene vinyl acetate (EVA), polyester, polyolefin or polyurethane type.

In this case, the coat of precursor composition is applied hot onto the non-adhesive material 18. In this embodiment, the polymer in the solid state undergoes a change of state as a result of an increase in temperature so as to reach and exceed its melting point, making it pass from the solid state to the liquid state. The hot-melt polymer is then maintained at temperature so as to perform an optimum coating step.

In these three cases, the polymer composition of the non-adhesive material 18 is adapted to fill the microcavities 13 of the upper face 11 of the liner 8.

More particularly, in both cases where the polymer composition of the non-adhesive material 18 is in the liquid state at ambient temperature and preferably in solution in organic solvents.

In order to fill the microcavities 13, the polymer composition of the non-adhesive material 18 is prepared so as to have a surface tension, in solution in organic solvents, less than or equal to the surface superficial tension of the surface of the superficial layer 12.

The polymer composition of the non-adhesive material 18 is then dried so as to evaporate the organic solvents. After evaporation of the organic solvents, the polymer composition of the non-adhesive material 18 is must at this stage, be prepared so as to present a in the liquid state. In parallel, the polymer composition of the non-adhesive material 18 has rather than a surface tension greater than or equal to the superficial surface tension of the superficial layer 12.

The differential between the surface tension of the polymer composition of the non-adhesive material 18, after evaporation of the organic solvents, and the superficial surface tension of the superficial layer 12 generates a dewetting phenomenon, that is to say, a spontaneous reduction of the contact area between the polymer composition of the non-adhesive material 18 in the liquid state and the surface of the superficial layer 12. Advantageously, this dewetting phenomenon encourages the concentration of the polymer composition of non-adhesive material 18 to the liquid state in the microcavities 13 of the upper face 11 of the liner 8.

In this embodiment, the polymer composition of the non-adhesive material 18 is prepared so as to have, after having evaporated the organic solvents, a surface tension of between 15 mN/m and 75 mN/m, preferably the surface tension is between 25 mN/m and 65 mN/m and preferably the surface tension is between 30 mN/m and 60 m N/m.

Depending on the type of polymer composition of the non-adhesive material 18 in the liquid state at ambient temperature that is used, the value of the surface tension of the polymer composition of the non-adhesive material 18 can be optimized through various parameters.

In the case of a polymer composition of the non-adhesive material 18 formed by a thermoplastic polymer in solvent phase, the value of the surface tension of the polymer composition of the non-adhesive material 18 can be optimized by the choice of organic solvents and the rate of dilution used. Typically, a solvent of the glycol ether type can enable a surface tension of between 20 mN/m and 60 mN/m to be obtained.

In the case of a polymer composition of the non-adhesive material 18 that is formed by precursor monomers of a non-adhesive polymer, the value of the surface tension of the polymer composition of the non-adhesive material 18 can be optimized by the choice of solvents of the aliphatic hydrocarbon type and/or solvents of the alcohol type and/or solvents of the siloxane type. Typically, a mixture of these solvents can enable a surface tension of between 15 mN/n and 60 mN/to be obtained.

It should be noted that in the two above-mentioned cases, it is possible to add to the polymer composition of the non-adhesive material 18 additional compounds such as a surfactant agent that enables the surface tension to be optimized, particularly by reducing it. To this end, surfactant type compounds based on modified polysiloxane and fluorocarbonated polymer are known to reduce the surface tension of a composition in the liquid state and to confer on the liquid composition remarkable selective positioning properties, that is to say, the ability to fill the microcavities 13.

As shown in FIGS. 2 and 3, the operation of applying the polymer composition of the non-adhesive material 18 is performed using a spreading tool 19 adjusted at a set height from the upper face 11 of the liner 8. Here, the spreading tool 9 is formed by a squeegee. However, the spreading tool 9 could be formed by any type of tool that makes it possible, on the one hand, to force during its passage the polymer composition of the non-adhesive material 18 to fill and concentrate only in the microcavities 13 and, on the other hand, to evacuate the polymer composition of the non-adhesive material 18 from the surface interstices 14 of the upper face 11 of the liner 8 without damaging the superficial layer 12 of the upper face 11.

In the case of a polymer composition of the non-adhesive material 18 of the hot-melt polymer type, when the hot-melt polymer comes into contact with the upper face 11 of the liner 8, the temperature of the polymer drops rapidly, which can lead to an increase in the viscosity of the polymer composition of the non-adhesive material 18. Thus, in order to optimize the filling and concentration of the polymer composition of the non-adhesive material 18 in the microcavities 13, the spreading tool 19 can have a heating function so as to liquefy, as it passes, the polymer composition of the non-adhesive material 18.

In practice, the height of the spreading tool 19 in relation to the upper face 11 of the liner 8 is determined on the basis of several factors such as the nature of the spreading tool 19, the differential in surface tension between the superficial layer 12 of the upper face 11 of the liner 8 and the surface tension of the polymer composition of non-adhesive material 18, the mass percentage of solid material in the polymer composition preparation, etc.

According to a first example of adjustment of the height of the spreading tool 19, when an elastomer flexible squeegee is used and the polymer composition of non-adhesive material 18 and the superficial layer 12 have a minimum surface tension differential, the flexible squeegee is then placed at a zero height of 0 μm in order to be in contact with the upper face 11 and skim the superficial interstice 14. In this embodiment, the elastomeric properties of the flexible squeegee enable it to be placed in contact with the superficial layer 12 without damaging it.

According to a second example of adjusting the height of the spreading tool, when a rigid metal squeegee is used and the polymer composition of non-adhesive material 18 and the superficial layer 12 have a large surface tension differential, for example greater than 40%, the squeegee is then placed at a height of between 0 μm and 100 μm, preferably the height of the squeegee is between 0 μm and 10 μm, preferably the height of the squeegee is between 0 μm and 5 μm and preferably the height of the squeegee is between 0 μm and 2 μm.

As shown in FIGS. 1 to 3, during the coating operation the polymer composition of non-adhesive material 18 forms a meniscus converging at the opening 15 of each microcavity 13.

Whichever type of polymer composition of non-adhesive material 18 is used, the step of forming the adhesion-controlling system 17 includes an operation of hardening the polymer composition of the non-adhesive material 18 having filled the microcavities 13. Advantageously, the hardening operation hardens the non-adhesive material 18 in the solid state while it is inserted into the microcavities 13.

In fact, in the case of a polymer composition of the non-adhesive material 18 formed by a thermoplastic polymer in solvent phase, the hardening operation is performed by eliminating the solvent. In this context, the hardening operation is preferably performed by a physical evaporation of the solvent, which involves diffusing hot air over the surface of the upper face 11 of the liner 8.

In the case of a polymer composition of the non-adhesive material 18 that is formed by precursor monomers of a non-adhesive polymer, the hardening operation is performed by an operation of polymerization of the precursor monomers of the non-adhesive polymer.

When the precursor monomers of a non-adhesive polymer are solvated, the hardening operation involves an operation of evaporating the solvent/s, followed by the operation of polymerizing the monomers. In this case, the polymerization operation can be thermo-catalyzed by heat diffusion and/or "UV" catalyzed by ultraviolet diffusion on the surface of the upper face 11 of the liner 8.

In the case of a polymer composition of the non-adhesive material 18 that is formed by a hot-melt polymer, the hardening operation is performed by a return to ambient temperature of the hot-melt polymer. The return to ambient temperature of the hot-melt polymer can be accelerated by cold diffusion on the surface of the upper face 11 of the liner 8. In practice, the liner 8 coated with the composition of non-adhesive material 18 is passed over a refrigerated cylinder.

Furthermore, the production method of a multilayer film 1 comprises a step of forming the adhesive layer 6. Here, the step of forming the adhesive layer 6 involves an operation of applying a formulation of adhesive polymer.

The formulation of adhesive polymer is applied in the liquid state onto the upper face 11 of the liner 8. To this end, a spreading tool 19 such as a Meyer bar, a squeegee, a cylinder or any form of system capable of applying a thin and continuous coat, is used to apply the formulation of adhesive polymer onto the upper face 11. In order to obtain an adhesive layer 6 of between 10 µm and 60 µm thick in the solid state, the spreading tool 19 is adjusted at a height from the upper face 11 of between 60 µm and 300 µm.

Advantageously, during the operation to apply the formulation of adhesive polymer, the formulation of adhesive polymer comes into contact with the non-adhesive material 18 inserted in the solid state into the microcavities 13. In fact, the formulation of adhesive polymer fills a free space in the microcavity 13 arranged at each opening 15 above the converging meniscus.

The step of forming the adhesive layer also involves a step of hardening the formulation of adhesive polymer. Performance of the hardening step depends on the type of formulation of adhesive polymer used.

In the case of a formulation of adhesive polymer formed by a thermoplastic polymer in solvent phase, the hardening operation is performed by elimination of the solvent. In this case, the elimination of the solvent is preferably performed by physical evaporation of the solvent, which is carried out by a diffusion of hot air applied to the formulation of adhesive polymer coating the liner 8.

In the case of a formulation of adhesive polymer formed by precursor monomers of adhesive, the hardening operation is performed by an operation of polymerization of the precursor monomers of adhesive. In this case, the polymerization operation can be thermo-catalyzed by heat diffusion and/or "UV" catalyzed by ultraviolet diffusion applied to the formulation of adhesive polymer coating the liner 8.

In the case of a formulation of adhesive polymer formed by a hot-melt polymer, the hardening operation is performed by a return to ambient temperature of the hot-met polymer. The return to ambient temperature of the hot-melt polymer can be accelerated by cold diffusion on the surface of the upper face 11 of the liner 8. In practice, the liner 8 coated with the composition of adhesive polymer is passed over a refrigerated cylinder.

The method for producing a multilayer film 1 also comprises a step of forming the body 3 of the film by laying a main polymeric layer 2 in the form of cast film on the connecting face 5 of the adhesive layer 6. Preferably, a main polymeric layer 2 is applied by lamination using a spreading tool 19 such as a Meyer bar.

It should be noted that a cast film corresponds to a polymeric film obtained by applying a coat of a polymer placed in suspension or in solution in a solvent and/or a plasticizer.

As indicated above, the main polymeric layer 2 forming the body 3 of the film can be of a polyvinyl chloride, polyurethane, polyolefin or acrylic type. Moreover, it is perfectly possible to laminate a commercial film wound on a roll in order to form the body 3 of the film.

Embodiment 1

In this first embodiment of the invention, the polymer composition of the non-adhesive material 18 is obtained from a solution of a thermoplastic methyl methacrylate polymer in solvent phase.

The thermoplastic methyl methacrylate polymer is solvated using a mixture of solvent comprising ethyl acetate and 1-methoxy-2-propanol.

Thus, the methyl methacrylate polymer comprises:

TABLE 1

Thermoplastic methyl methacrylate polymer composition

| Nature | Description/Supplier | Weight Percent in % |
|---|---|---|
| Methyl methacrylate polymer | DIANAL BR-87, UNIPEX | 12.51 |
| Solvent 1 | Ethyl acetate | 37.55 |
| Solvent 2 | 1-Methoxy-2-propanol | 49.94 |
| | | 100 |

Here, the 1-methoxy-2-propanol has a surface tension of 71 mN/m and enables the surface tension of the formula to be modulated between the low surface tension value generated by the 23 mN/methyl acetate and the surface tension of the superficial layer 12 generating the phenomenon of dewetting the polymer composition of the non-adhesive material 18. Thus, by varying the ethyl acetate/1-methoxy-2-propanol ratio it is possible to adapt to different surface tensions of the superficial layer 12 of the upper face 11 of the liner 8.

The thermoplastic methyl methacrylate polymer in solvent phase is applied using a spreading tool 19 formed by a flexible squeegee passed in contact with the upper face 11 and its superficial interstices 14. The flexible squeegee forces the thermoplastic methyl methacrylate polymer in solvent phase to fill the microcavities 13.

The thermoplastic methyl methacrylate polymer in solvent phase inside the microcavities 13 is hardened by evaporation of the ethyl acetate/1-methoxy-2-propanol by being passed through a heat chamber for 3 minutes at 110° C. then cooled for 15 minutes at ambient temperature.

The formulation of adhesive polymer comprises an acrylic polymer modified by the addition of a tackifying resin based on rosin derivatives. Here the modified acrylic polymer is delivered as a solution by a supplier and comprises a dry extract of 49%.

The formulation of acrylic adhesive polymer is solvated with ethyl acetate and heptane as follows:

TABLE 2

Formulation of acrylic adhesive polymer

| Nature | Description/Supplier | Weight Percent in % |
|---|---|---|
| Modified acrylic polymer | Aroset S390, ASHLAND | 50.00 |
| Solvent 1 | Ethyl acetate | 40.00 |
| Solvent 2 | Heptane | 10.00 |
| | | 100 |

The formulation of adhesive polymer in the liquid state is applied to the surface of the upper face of the liner 8 using a Meyer bar.

The formulation of adhesive polymer in the liquid state applied to the liner 8 is hardened by drying in a heat chamber for 3 minutes at 110° C. in order to form the adhesive layer 6.

Without waiting for the return to ambient temperature of the liner/adhesive complex, the body 3 of the film is formed. For this purpose, a cast or calendared PVC film is laminated onto the adhesion face 7 of the adhesive layer 6.

Embodiment 2

In this second embodiment of the invention, the polymer composition of the non-adhesive material 18 comprises acrylic precursor monomers the polymerization of which is UV-catalyzed.

The polymer composition of the non-adhesive material 18 is solvated in a solvent mixture comprising isopropyl alcohol and heptane as follows:

TABLE 3

Composition of acrylic precursor monomers

| Nature | Description/Supplier | Weight Percent in % |
|---|---|---|
| Photoinitiator based on Benzophenone | Darocour BP, BASF | 1.76 |
| Difunctional Reactant Diluent | Laromer HDDA, BASF | 7.03 |
| Acrylic Precursor Monomers | Pentaerythritol Tri and Tetra Acrylate | 22.84 |
| Co-initiator of Polymerization | Ebecryl 7100, ALLNEX | 3.51 |
| Surfactant Agent | Tego Twin 4100, EVONIK | 2.01 |
| Solvent 1 | Isopropyl Alcohol | 48.69 |
| Solvent 2 | Heptane | 14.16 |
| | | 100 |

It should be noted that in this composition of precursors of the non-adhesive material 18 the photo-initiator compound enables the polymerization reaction to be initiated by converting UV photons into free radicals.

In the same way, the co-initiator enables free radicals to be generated when it detects UV photons. However, the co-initiator compound is much more sensitive that the photo-initiator and enables monomers found deep in the polymer composition of the non-adhesive material 18 to be polymerized.

Moreover, the difunctional reactant diluent reduces the viscosity of the polymer composition of non-adhesive material 18 and participates in the polymerization reaction without rigidifying the chain.

The surfactant agent reduces the surface tension of the polymer composition of the non-adhesive material 18 and thus promotes the dewetting phenomenon.

Here, the isopropyl alcohol has a surface tension of 23 mN/m and the heptane has a surface tension of 20 mN/m, which enables the level of surface tension of the solution to be controlled, the surfactant agent reduces the surface tension of the polymer composition of the non-adhesive material 18 and promotes the phenomenon of positioning or the capacity to fill the microcavities 13.

In order to form the adhesion-controlling system 17 formed by acrylic particles, the polymer composition of the non-adhesive material 18 is applied with the aid of a flexible spreader that passes in contact with the upper face 11 and its superficial interstices 14. The flexible spreader in contact with the liner 8 forces the polymer composition of the non-adhesive material 18 to fill the microcavities 13.

The polymer composition of the non-adhesive material 18 contained in the microcavities 13 of the liner 8 is hardened by drying in a heat chamber for 3 minutes at 110° C. then cooled for 15 minutes at ambient temperature.

Polymerization of the polymer composition of the non-adhesive material 18 inserted and dried in the microcavities 13 is achieved under UV lamps with an irradiation of 2.3 j/cm2.

Furthermore, the steps of forming the adhesive layer 6 and the body 3 of the film adopt the same operating method and the same compounds as those described in Embodiment 1.

We claim:
1. A method, comprising the steps of:
    forming a liner with an upper liner face and a lower liner face opposite said upper liner face;
    forming a plurality of microcavities on said upper liner face;
    selectively positioning a polymeric, non-adhesive material composition in said microcavities so as to form an adhesion controlling system on said upper liner face; and
    applying said liner over a pressure sensitive adhesive layer being comprised of an adhesion face and a connection face opposite said adhesion face, said adhesion controlling system contacting said adhesion face so as to form a multilayer film,
    wherein said polymeric, non-adhesive material composition is comprised of a thermoplastic polymer in solvent phase.
2. The method, according to claim 1, further comprising the step of:
    hardening the polymeric, non-adhesive material composition, after the step of selectively positioning.
3. A method, further comprising:
    forming a liner with an upper liner face and a lower liner face opposite said upper liner face;
    forming a plurality of microcavities on said upper liner face;
    selectively positioning a polymeric, non-adhesive material composition in said microcavities so as to form an adhesion controlling system on said upper liner face; and
    applying said liner over a pressure sensitive adhesive layer being comprised of an adhesion face and a connection face opposite said adhesion face, said adhesion controlling system contacting said adhesion face so as to form a multilayer film,
    wherein the step of selective positioning comprises the steps of:
    applying a coating of said polymeric, non-adhesive material composition with a spreading tool adjusted at a set height from said upper liner face; and
    passing said spreading tool over said upper liner face so as to fill on said microcavities with said polymeric, non-adhesive material composition from said coating.
4. The method, according to claim 3, wherein said set height is between 0 μm and 100 μm.
5. The method, according to claim 1, wherein said polymeric, non-adhesive material composition has a surface tension between 10 mN/m and 60 mN/m.
6. The method, according to claim 3, wherein said polymeric, non-adhesive material composition is comprised of a thermoplastic polymer in solvent phase.
7. The method, according to claim 1, further comprising the step of:
    hardening said polymeric, non-adhesive material composition, after the step of selectively positioning, wherein the step of hardening said polymeric, non-adhesive material composition is comprised of the step of eliminating said solvent phase physical drying.

8. The method, according to claim 3, wherein said polymeric, non-adhesive material composition is comprised of precursor monomers of a non-adhesive polymer.

9. The method, according to claim 8, further comprising the step of:
hardening said polymeric, non-adhesive material composition, after the step of selectively positioning,
wherein the step of hardening said polymeric, non-adhesive material composition is comprised of polymerizing said precursor monomers.

10. The method, according to claim 9, wherein the step of polymerizing is comprised of crosslinking.

11. The method, according to claim 3, wherein said polymeric, non-adhesive material composition is comprised of a hot-melt polymer.

12. The method, according to claim 11, further comprising the step of:
hardening said polymeric, non-adhesive material composition, after the step of selectively positioning,
wherein the step of hardening is comprised of cooling said hot-melt polymer.

13. The method, according to claim 1, wherein the step of applying said liner over said pressure sensitive adhesive layer is comprised of the steps of:
applying a coat of a formulation of an adhesive polymer onto said liner; and
hardening said formulation of said adhesive polymer.

14. The method, according to claim 1, further comprising the steps of:
laying a cast film on said connection face of said pressure sensitive adhesive layer so as to form a main polymeric layer, said pressure sensitive adhesive layer being between said main polymeric layer and said liner.

15. A multilayer covering film, comprising:
a liner having an upper liner face with a plurality of microcavities and a lower line face opposite said upper liner face;
a pressure sensitive adhesive layer being comprised of an adhesion face and a connection face opposite said adhesion face, said liner applied over said pressure sensitive adhesive layer;
a polymeric, non-adhesive material composition being selectively positioned in said microcavities so as to form an adhesion controlling system on said upper liner face of said liner; and
a main polymeric layer having a first face and a second face opposite said first face, said first face contacting said pressure sensitive adhesive layer, said pressure sensitive adhesive layer being between said main polymeric layer and said liner.

16. The film, according to claim 15, wherein said polymeric, non-adhesive material composition is hardened.

17. The method, according to claim 1, further comprising the steps of:
separating said liner of said multilayer film from said pressure sensitive adhesive layer; and
transferring said adhesion-controlling system from said liner to said adhesion face of said pressure sensitive adhesive layer by adhesion to said adhesive layer so as to form a covering film.

18. The method, according to claim 17, wherein said covering film is comprised of said adhesion-controlling system covers a surface of 0.5 to 10% of a total surface of said adhesion face.

* * * * *